United States Patent [19]

Suyama et al.

[11] Patent Number: 5,252,676
[45] Date of Patent: Oct. 12, 1993

[54] ETHYLENE POLYMER CROSSLINKING COMPOSITION

[75] Inventors: Shuji Suyama; Hideyo Ishigaki, both of Aichi; Hiroshi Okada, Tokoname, all of Japan

[73] Assignee: Nippon Oil & Fats Co., Ltd., Tokyo, Japan

[21] Appl. No.: 903,259

[22] Filed: Jun. 24, 1992

[30] Foreign Application Priority Data

Jun. 24, 1991 [JP] Japan .................. 3-177723
Apr. 28, 1992 [JP] Japan .................. 4-134472

[51] Int. Cl.$^5$ ........................... C08F 255/02
[52] U.S. Cl. ................... 525/320; 525/263; 525/265; 525/324
[58] Field of Search ............ 526/336; 525/263, 265, 525/320, 324

[56] References Cited

U.S. PATENT DOCUMENTS

| | | | |
|---|---|---|---|
| 4,994,539 | 2/1991 | Orikasa et al. | 576/326 |
| 5,091,479 | 2/1992 | Beijleveld et al. | 525/263 |
| 5,130,376 | 7/1992 | Shih | 525/309 |

FOREIGN PATENT DOCUMENTS

| | | |
|---|---|---|
| 0128851 | 12/1984 | European Pat. Off. |
| 0197303 | 10/1986 | European Pat. Off. |
| 0315431 | 5/1989 | European Pat. Off. |
| 54-8500 | 4/1979 | Japan |
| 54-132644 | 10/1979 | Japan |
| 2-31106 | 7/1990 | Japan |

OTHER PUBLICATIONS

"Friends to Polymers", vol. 18, No. 6, 1981, pp. 373-380.
I. & E. C. Product Research and Development, vol. 2, No. 3, L. P. Lenas, "Evaluation of Cross-Linking Coagents in Ethylene-Propylene Rubber", Sep. 1963, pp. 202-208.

Primary Examiner—Joseph L. Schofer
Assistant Examiner—R. H. Delmendo
Attorney, Agent, or Firm—Oblon, Spivak, McClelland, Maier & Neustadt

[57] ABSTRACT

A composition for cross linking an ethylene polymer comprises an organic peroxide as a cross linking agent and a compound represented by the formula:

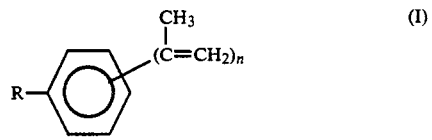

wherein R stands for a hydrogen atom or one member selected from the class consisting of alkyl groups of 1 to 9 carbon atoms and n is an integer of 2 or 3. A method for cross linking the ethylene type polymer uses the composition mentioned above. An electric power cable comprises a core coated with resinous layers produced by the method described above.

5 Claims, 3 Drawing Sheets

ETHYLENE POLYMER CROSSLINKING COMPOSITION

BACKGROUND OF THE INVENTION

Field of the Invention

This invention relates to an ethylene polymer cross linking composition capable of enhancing the degree with which an ethylene polymer is cross linked by application of heat, a method for the cross linking of an ethylene polymer by the use of the composition, and an electric power cable provided with a resinous layer of a cross linked-polymer produced by the method mentioned above.

This invention further relates to an ethylene polymer cross linking-composition which is in a liquid state at normal room temperature, manifests low volatility, and is stable for a long time.

Prior Art Statement

Heretofore, it has been known that in the production of a shaped article of a cross linked ethylene polymer using an organic peroxide as a cross linking agent, an increase in the cross linking degree can be attained by using the cross linking agent in an increased amount or by using the cross linking agent in combination with a cross linking auxiliary.

As a cross linking auxiliary, triallyl isocyanurate (TAIC) is mentioned in "Friends to Polymers", Vol. 18, No. 6, page 373 (1981). Such cross linking auxiliaries as divinylbenzene are mentioned in "I. & E. C Product Research and Development", Vol. 2, No. 3, page 202 (1963). Such vinyl compounds as α-methyl styrene and acrylic esters are cited as examples of the cross linking auxiliary in Japanese Patent Publication No. SHO 54-8500.

Rubber-plastic insulated electric power cable (hereinafter referred to simply as "electric power cable") generally comprises a conductor core and a semiconductive layer and an insulating layer enclosing the core. These layers are each formed by preparing a resin composition using as a basis thereof a polyethylene resin incorporating a cross linking agent therein, extruding the resin composition through an extruding device around the outer periphery of the conductor and coating the conductor with the extruded resin composition, and superheating the formed coat thereby cross linking the base resin.

As the cross linking agent for polyethylene, dicumyl peroxide (DCP) is prevalently used. Since this substance is solid (melting point 38°-40° C.) at normal room temperature, it is liable to occlude foreign matter while it is being handled and the foreign matter occluded therein is not easily discovered. Mixing the ethylene polymer and the DCP requires use of an extruding device, for example. For the DCP to be fed at a fixed rate to the extruding device, it must be melted by heating in advance of the feeding. Use of DCP therefore adds to the number of operational steps and requires considerable attention to operational safety.

The electric power cable is produced, for example, by a method which comprises preparing a mixture of molten resin with a cross linking agent which is used alone or in combination with an antioxidant and other additives, directly injecting the mixture into an extruding device, and coating a conductor core with an extruded strip of the mixture. In this case, the cross linking agent is required to be liquid at normal room temperature.

For the solution of this problem, cross linking quality organic peroxides which are liquid at normal room temperature have been proposed. Japanese Patent Publication No. HEI 2-31106, for example, discloses an organic peroxide mixture comprising 25 to 10% by weight of bis(α-t-butyl peroxyisopropyl)benzene and 75 to 90% by weight of isopropyl cumyl-t-butyl peroxide. Japanese Patent Public Disclosure No. SHO 54-132664 discloses an alkyl group-substituted dicumyl peroxide.

Such cross linking auxiliaries as TAIC disclosed in "Friends to Polymers", Vol. 18, No. 6, page 373 and divinylbenzene disclosed in "I. & E. C Product Research and Development", Vol. 1, No. 3, page 202 are capable of independent polymerization by themselves. When such a cross linking auxiliary is caused to coexist with an organic peroxide as a cross linking agent or when the cross linking auxiliary and the cross linking agent are simultaneously mixed with and dispersed in a polymer, the cross linking auxiliary partly polymerizes. To avoid this polymerization, the cross linking auxiliary and the cross linking agent must be mixed and dispersed separately of each other or they must be mixed and dispersed at a relatively low temperature. If the temperature is low, however, the polymer manifests high viscosity and the dispersion consumes a long time. The method disclosed in Japanese Patent Publication No. SHO 54-8500 is effective in preventing the polymer from scorching but not effective in enhancing the degree of cross linking. The α-methyl styrene and acrylic esters have small molecular weights and, therefore, have high vapor pressures. They therefore volatilize when they are kneaded with an ethylene polymer or when the composition produced by the mixture with the ethylene polymer is stored. This volatilization causes inconsistent quality of the produced cross linked polymer.

The polymers produced by using the organic peroxides taught by Japanese Patent Publication No. HEI 2-31106 and Japanese Patent Public Disclosure No. SHO 54-132644 have a disadvantage in that their cross linking degrees are lower than those of the polymers produced by using dicumyl peroxide, the most typical cross linking peroxide. As regards organic peroxides which are liquid at normal room temperature, organic peroxides having still lower melting points than the organic peroxides taught by Japanese Patent Publication No. HEI 2-31106 and Japanese Patent Public Disclosure No. SHO 54-132644 prove desirable for use during the winter. These organic peroxides are required to assume a liquid state at relatively low temperatures and manifest low vapor pressures.

The electric power cable will now be described. When the electric power cable is provided with such resinous layers as an insulating layer and a semiconducting layer, these resinous layers are apt to suffer scorching or inclusion of minute amber colored particles on account of the cross linking agent which is used in their formation. Further, during the formation of these resinous layers, they are liable to liberate a gas as a product of the decomposition of the cross linking agent or give rise to water trees. A practicable method which is capable of forming these resinous layers without inducing the problems mentioned above has therefore been desired.

SUMMARY OF THE INVENTION

Through an extended study of the drawbacks of the prior art, the inventors developed a cross linking composition for an ethylene polymer which is free from the problems mentioned above. This invention has been perfected as a result.

To be specific, this invention is directed to an ethylene polymer cross linking composition which comprises an organic peroxide as a cross linking agent and a compound represented by the following formula:

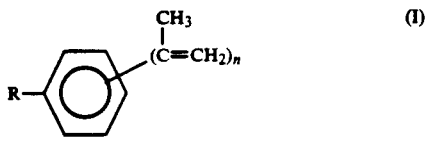
(I)

(wherein R stands for a hydrogen atom or an alkyl group of 1 to 9 carbon atoms and n is an integer of 2 or 3), a method for cross linking an ethylene polymer by treating this ethylene polymer with the ethylene polymer-cross linking composition mentioned above, and an electric power cable consisting essentially of a conductor and at least two resinous layers coating the conductor, at least one of the two resinous layers being formed of a cross linked ethylene polymer cross linked by the method described above.

The above and other features of the invention will become apparent from the following description made with reference to the accompanying drawings.

DESCRIPTION OF THE PREFERRED EMBODIMENTS

Figure 1:
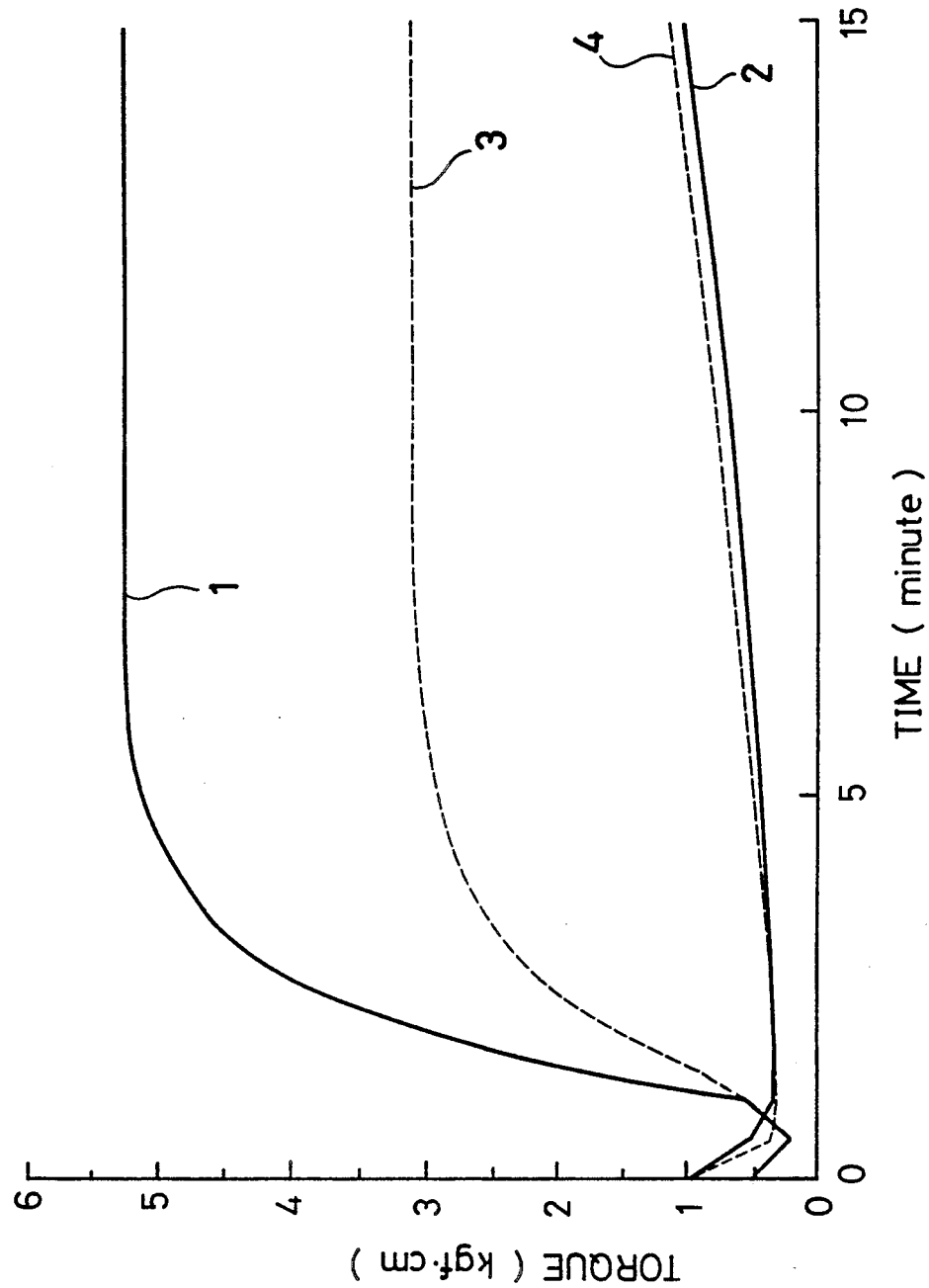
FIG. 1 a diagram showing the time-course changes in the magnitude of torque found in a heating test performed on cross linked polyethylene samples obtained in Example 1 and Comparative Experiment 1.

The compounds which are represented by the formula (I) include o-diisopropenyl benzene, m-diisopropenyl benzene, p-diisopropenyl benzene, 1,2,4-triisopropenyl benzene, 1,3,5-triisopropenyl benzene, 3-isopropyl-o-diisopropenyl benzene, 4-isopropyl-o-diisopropenyl benzene, 4-isopropyl-m-diisopropenyl benzene, 5-isopropyl-m-diisopropenyl benzene, 2-isopropyl-p-diisopropenyl benzene, and mixtures thereof, for example (hereinafter referred to collectively as "poly-IPBs). Among the poly-IPBs cited above, the m-diisopropenyl benzene proves particularly desirable because it is liquid at normal room temperature and markedly effective in enhancing the cross linking degree of polymer.

As concrete examples of the organic peroxide to be used in this invention, dialkyl peroxides such as dicumyl peroxide, t-butylcumyl peroxide, 2,5-bis(t-butyl peroxy)2,5-dimethyl hexane, 2,5-bis(t-butyl peroxy) 2,5-dimethyl hexyne-3, di-t-butyl peroxide, isopropylcumyl-t-butyl peroxide, and bis(α-t-butyl peroxyisopropyl)benzene, peroxy ketals such as 1,1-bis(t-butyl peroxy) cyclohexane, 1,1-bis(t-butyl peroxy) 3,3,5-trimethyl cyclohexane, 1,1-bis(t-butyl peroxy) cyclododecane, n-butyl-4,4-bis(t-butyl peroxy) valerate, ethyl-3,3-bis(t-butyl peroxy) butyrate, and 3,3,6,6,9,9-hexamethyl-1,2,4,5-tetraoxy cyclononane, and peroxy esters such as bis(t-butyl peroxy) isophthalate, t-butyl peroxy benzoate, and t-butyl peroxy acetate may be cited.

Among the organic peroxides cited above, dicumyl peroxide (hereinafter referred to as "DCP") and bis(α-t-butyl peroxy isopropyl) benzene prove particularly desirable because they exhibit high efficiency in cross linking a polymer and manifest only very low volatility. They are not easily handled because they are solid at 25° C. Compositions which allow precipitation of crystals at temperatures not exceeding 25° C. cross link a polymer with high efficiency, and manifest only low volatility can be produced by mixing these organic peroxides with poly-IPBs or mixing them with isopropyl cumyl-t-butyl peroxide which is liquid at −10° C.

The isopropyl cumyl-t-butyl peroxide proves particularly desirable as a cross linking agent for the formation of resinous layers as in an electric power cable because it has a high thermal decomposition temperature as compared with the DCP which has been heretofore used most widely as a cross linking agent, exhibits only low susceptibility to scorching, assumes a liquid state at normal room temperature, has relatively low volatility, and does not produce a harmful decomposition product.

Except for bis(α-butyl peroxyisopropyl) benzene, 3,3,6,6,9,9-hexamethyl-1,2,4,5-tetraoxy cyclononane, bis(6-t-butyl peroxy) isophthalate, t-butyl peroxy benzoate, and DCP, the peroxides cited above are liquid at −10° C.

The ethylene polymers which are usable for the cross linking aimed at by this invention include polyethylene, ethylene-propylene copolymer (EPR), ethylene-butene copolymer, ethylene-pentene copolymer, ethylene-vinyl acetate copolymer (EVA), ethylene-propylene-diene copolymer (EPDM), chlorinated polyethylene, ethylene-ethyl acrylate copolymer (EEA), ethylene-methyl methacrylate copolymer, ethylene-glycidyl methacrylate copolymer (EGMA), and ethylene-acrylonitrile copolymer, for example. Polyethylene, EPR, EVA, EEA, and EGMA are superior to the other ethylene polymers cited above in point of the effect in improving the cross linking degree.

In the composition of this invention, the mixing ratio of the organic peroxide to the poly-IPB is generally in the range between 1:0.02 and 1:3 by weight. The composition does not exhibit sufficient effect in improving the cross linking degree if the mixing ratio of the poly-IPB to the organic peroxide is less than 1:0.02. The cross linking degree tends to decline if the mixing ratio exceeds 1:3. The particularly desirable range of this mixing ratio is between 1:0.1 and 1:1.

The amount of the organic peroxide and that of the poly-IPB to be used for cross linking the ethylene polymer are desired to be respectively in the range between 0.3 and 5 parts by weight and the range between 0.1 and 3 parts by weight, based on 100 parts by weight of the ethylene polymer. The effect in improving the cross linking degree of the polymer is not sufficient if the amount of the organic peroxide is less than 0.3 part by weight. The cross linking degree increases excessively and the produced polymer becomes brittle if this amount exceeds 5 parts by weight. The cross linking degree is not sufficient if the amount of the poly-IPB is less than 0.1 part by weight. The cross linking degree is liable to be unduly low if this amount exceeds 3 parts by weight.

When the polymer is cross linked with the composition of this invention, independent addition of the components of this composition to the polymer is as effective as when the composition of this invention is used in its whole form in the polymer.

When the cross linking of an ethylene polymer is effected by the use of the composition of this invention, various additives such as, for example, antioxidant, pigment, ultraviolet stabilizer, filler, plasticizer, slip additive, and cross linking auxiliary which are generally used in cross linking can be added to the composition.

The antioxidants which are effectively usable herein include phenol compounds such as 4,4'thiobis(3-methyl-6-t-butyl phenol), 2,5-di-t-butyl hydroquinone, and 2,6-di-t-butyl-p-cresol, phosphorus compounds, and sulfur compounds such as bis(2-methyl-4-(3-n-alkyl thiopropioniloxy)-5-t-butylphenyl) sulfide, 2,2'-thiodiethylene bis-[3-(3,5-di-t-butyl-4-hydroxy phenyl) propionate], dilauryl thiopropionate, and distearyl thiopropionate, for example.

The amount of the antioxidant to be incorporated in the composition is generally in the range between 0.05 and 1.0 part by weight, based on 100 parts by weight of the ethylene polymer.

The antioxidant is inherently capable of inhibiting the reaction of cross linking. The composition of this invention accomplishes the effect of improving the cross linking degree and precluding scorching even in the presence of this antioxidant.

When the composition of this invention is used in cross linking the polymer, the cross linking temperature is generally in the range between 110° and 220° C. For ensuring a proper cross linking time, the desirable range of the cross linking temperature is between 130° and 200° C.

When the electric power cable of this invention comprises a conductor core and at least two resinous layers differing in function and encircling the conductor, at least one of these resinous layers consists essentially of an ethylene polymer cross linked with the cross linking composition of this invention.

The effects of this invention will now be described.

(1) When the polymer is cross linked by the use of the composition of this invention which combines an organic peroxide with a compound represented by the formula (I), the cross linking degree of the polymer is improved and the time up to the start of scorching is prolonged as compared with the cross linking involving sole use of the organic peroxide.

(2) No polymerization occurs when a polymerizing auxiliary is used as mixed with the polymer which is subjected to the cross linking, for example.

(3) When an organic peroxide which is solid at normal room temperature, specifically at 25° C., is used in the composition of this invention, the produced composition is liquid at normal room temperature or at lower temperatures.

(4) The composition of this invention possesses high stability against storage, exhibits small vapor pressure, and volatilizes at a slow speed. Further, in the cross linking to be effected by the use of the composition of this invention, the effects of this invention enumerated above can be attained even in the presence of an antioxidant.

(5) The resinous layers in the electric power cable of this invention does not suffer scorching and manifests a high cross linking degree (gel ratio). The electric power cable which is provided with these resinous layers, therefore, enjoys highly satisfactory electrical properties (AC breakdown strength). Since the amount of the cross linking agent required to be used effectively in the formation of the resinous layers in this invention is small as compared with that which is required in the conventional method, the amounts of gas and water trees liberated in consequence of the decomposition of the cross linking agent are proportionately small.

This invention will now be described more specifically below with reference to working examples and comparative experiments. The abbreviations of organic peroxides and additives to be used hereinafter denote the following compounds.

DCP: Dicumyl peroxide (purity 99%; marketed by Nippon Oil & Fats Co., Ltd. as "Percumyl D")
BCP: t-Butyl cumyl peroxide (purity 92%; marketed by Nippon Oil Fats & Co., Ltd. as "Perbutyl C")
DBC: m-Bis(α-t-butyl peroxyisopropyl) benzene (purity 99%; marketed by Nippon Oil & Fats Co., Ltd. as "Perbutyl P")
IPC: Isopropyl cumyl-t-butyl peroxide (m/p 60/40 and purity 94%; marketed by Nippon Oil & Fats Co., Ltd. as "Perbutyl IPC")
25B: 2,5-Bis(t-butyl peroxy)-2,5-dimethyl hexane (purity 99%; marketed by Nippon Oil & Fats Co., Ltd. as "Perhexa 25B")
25Y: 2,5-Bis(t-butyl peroxy)-2,5-dimethylhexine-3 (purity 90%; marketed by Nippon Oil & Fats Co., Ltd. as "Perhexine 25B")
3M: 1,1-Bis(t-butyl peroxy)-3,3,5-trimethyl cyclohexane (purity 92%; marketed by Nippon Oil & Fats Co., Ltd. as "Perhexa 3M")
IPCC: Isopropyl cumylcumyl peroxide (synthesized by condensing isopropyl cumyl alcohol (m/p=60/40) and cumene hydroperoxide in a ratio of 1/1 (mol) in the presence of a perchloric acid catalyst)
MDIB: m-Diisopropenyl benzene
XDIB: Diisopropenyl benzene (o-/m-/p-=3/67/30)
TIB: 1,2,4-Triisopropenyl benzene
RDIB: 4-Isopropyl-o-diisopropenyl benzene/4-isopropyl-m-diisopropenyl benzene/2-isopropyl-p-diisopropenyl benzene=1/1/1
αMS: α-Methyl styrene
DVB: p-Divinyl benzene
TBP: 4,4'-Thiobis(3-methyl-6-t-butyl phenol)
OMA: 2-Ethylhexyl methacrylate
TAIC: Triallyl isocyanurate

EXAMPLE 1

A composition was obtained by mixing 500 g of low-density polyethylene [marketed by Nippon Unicar Co., Ltd. as "Polyethylene (NUC-9025)"] with 12.5 g of DCP and g of MDIB. This composition was kneaded by the use of heating rolls at about 110° C. for about 20 minutes. The produced composition was homogeneous and showed no abnormal surface condition. It was subjected to a heating test with a testing instrument (marketed by Toyo-Boldwin K.K. as "JSR Curastometer III"). The torque as a function of the heating time obtained at 180° C. and 145° C. in this heating test are shown by the curves 1 and 2 in FIG. 1. In the diagram, the maximum torque at 180° C. is found to be 5.24 kgf.cm.

The scorching time at 145° C. was determined as follows.

The time required for the torque to rise from the minimum torque at 145° C. by of 10% of the maximum torque at 180° C. was clocked and recorded as the scorching time. The results are shown in Table 1.

COMPARATIVE EXPERIMENT 1

The procedure of Example 1 was repeated, except that the use of MDIB was omitted. The changes in torque as a function of the heating time are shown by the curves 3 and 4 in FIG. 1. The results obtained are shown in Table 1.

It will be noted from FIG. 1 that compared with Comparative Experiment 1, in Example 1 the cross linking speed and cross linking degree were higher at the high temperature (180° C.) and the cross linking speed was lower at the low temperature (145° C.). This fact indicates that Example 1 improved the cross linking degree and prolonged the time before start of scorching.

COMPARATIVE EXPERIMENT 2

The procedure of Example 1 was repeated, except that 13 g of IPCC was used in place of DCP and the use of MDIB was omitted. The results are shown in Table 1.

COMPARATIVE EXPERIMENT 3

The procedure of Example 1 was repeated, except that 5 g of DVB was used in place of MDIB. The results are shown in Table 1. The surface of the composition obtained after the kneading with heating rolls showed spots presumed attributable to polymerization of DVB.

COMPARATIVE EXPERIMENT 4

The procedure of Example 1 was repeated, except that 5 g of TAIC was used in place of MDIB. The results are shown in Table 1. The surface of the composition obtained after the kneading with heating rollers showed spots presumed attributable to polymerization of TAIC.

It will be noted from the results of Example 1 and Comparative Experiments 3 and 4 that the composition of this invention did not undergo a polymerization reaction during the kneading operation.

EXAMPLES 2 TO 19 AND COMPARATIVE EXPERIMENTS 5 TO 22

The procedure of Example 1 was repeated, except that the percentage composition of the composition was varied as shown in Table 1. The results are shown in Table 1.

TABLE 1

| Example No. | Peroxide (A) | (g) | Compound of formula (I) (B) | (g) | TBP (b) | B/A (g) | Time* (min) | Maximum torque at 180° C. (kgf·cm) | Comparative Experiment No. | Peroxide (g) | | Additive (g) | | Time* (min) | Maximum torque (kgf·cm) |
|---|---|---|---|---|---|---|---|---|---|---|---|---|---|---|---|
| 1 | DCP | 12.5 | MDIB | 5.0 | | 0.40 | 12.2 | 5.24 | 1 | DCP | 12.5 | | | 5 | 3.10 |
| 2 | DCP | 12.5 | XDIB | 5.0 | | 0.40 | 12.5 | 5.20 | 2 | IPCC | 13 | | | 8 | 2.51 |
| 3 | DCP | 12.5 | RDIB | 5.0 | | 0.40 | 10.4 | 4.61 | 3 | DCP | 12.5 | DVB | 5.0 | 3.5 | 3.88 |
| 4 | DCP | 12.5 | TIB | 5.0 | | 0.40 | 9.9 | 5.96 | 4 | DCP | 12.5 | TAIC | 5.0 | 2.6 | 4.50 |
| 5 | DCP | 8.7 | MDIB | 3.8 | | 0.44 | 10.7 | 3.50 | 5 | DCP | 12.5 | OMA | 5.0 | 9.3 | 2.68 |
| | | | | | | | | | 6 | DCP | 12.5 | αMS | 5.0 | 6 | 3.25 |
| 6 | DCP | 12.5 | MDIB | 2.5 | 1.0 | 0.20 | 11 | 3.62 | 7 | DCP | 12.5 | TBP | 1.0 | 10 | 2.78 |
| | | | | | | | | | 8 | DCP | 12.5 | αMS TBP | 2.5 1.0 | 13 | 2.92 |
| 7 | DCP | 12.5 | MDIB | 5.0 | 1.0 | 0.40 | 16 | 4.49 | 9 | DCP | 12.5 | αMS TBP | 5.0 1.0 | 16 | 2.92 |
| 8 | DCP | 12.5 | MDIB | 7.5 | 1.0 | 0.60 | 17 | 4.31 | 10 | DCP | 12.5 | αMS TBP | 7.5 1.0 | 18 | 2.30 |
| 9 | DCP | 12.5 | MDIB | 5.0 | 1.0 (2.5) | 0.40 | 16 | 4.96 | | | | | | | |
| 10 | DCP IPC | 9.3 1.6 | MDIB | 1.6 | | 0.17 | 8.5 | 3.40 | 11 | DCP IPC | 10.6 1.9 | | | 5.6 | 2.90 |
| 11 | DCP IPC | 6.3 5.7 | MDIB | 5.0 | 1.0 | 0.42 | 25 | 4.43 | 12 | DCP IPC | 6.3 5.7 | TBP | 1.0 | 16.5 | 2.36 |
| 12 | IPC | 11.5 | MDIB | 2.5 | 1.0 | 0.22 | 22 | 2.45 | 13 | IPC | 11.5 | TBP | 1.0 | 22 | 1.43 |
| | | | | | | | | | 14 | IPC | 11.5 | αMS | 2.5 | 24 | 1.86 |
| 13 | IPC | 11.5 | MDIB | 5.0 | 1.0 | 0.44 | 25 | 3.09 | 15 | IPC | 11.5 | αMS TBP | 5.0 1.0 | 21 | 1.69 |
| 14 | DCP BCP | 6.3 5.3 | MDIB | 5.0 | 1.0 | 0.43 | 26 | 4.20 | 16 | DCP BCP | 6.3 5.3 | TBP | 1.0 | 16.5 | 2.67 |
| 15 | DBC | 8.0 | MDIB | 2.5 | 1.0 | 0.31 | 28 | 4.25 | 17 | DBC | 8.0 | TBP | 1.0 | 27 | 3.80 |
| | | | | | | | | | 18 | DBC | 8.0 | αMS TBP | 2.5 1.0 | 29 | 3.28 |
| 16 | DBC IPC | 4.0 5.7 | MDIB | 5.0 | 1.0 | 0.43 | 36 | 4.43 | 19 | DBC IPC | 4.0 5.7 | TBP | 1.0 | 24.5 | 2.50 |
| 17 | DBC | 8.0 | MDIB | 5.0 | 1.0 | 0.82 | 31 | 4.29 | 20 | DBC | 8.0 | αMS TBP | 5.0 1.0 | 32 | 3.79 |
| 18 | DBC BCP | 4.0 5.3 | MDIB | 5.0 | 1.0 | 0.54 | 46 | 3.68 | 21 | DBC BCP | 8.0 5.3 | TBP | 1.0 | 30 | 2.42 |
| 19 | DBC IPC | 2.0 8.0 | MDIB | 2.5 | | 0.25 | 12 | 2.67 | 22 | DBC IPC | 2.0 8.0 | | | 8 | 2.33 |

The numeral given in brackets in the "TBP" column indicates the amount of TAIC used additionally.
*The time before the start of scorching at 145° C.

The contents of Table 1 will now be explained.

RE; EXAMPLES 1 TO 5 AND COMPARATIVE EXPERIMENT 1

These experiments demonstrate that the combined use of a compound of the formula (I) with an organic peroxide improves the maximum torque and prolongs the time before the start of scorching.

RE: COMPARATIVE EXPERIMENTS 3 AND 4

These experiments demonstrate that the omission of the use of a compound of the formula (I) and the use of a known cross linking auxiliary results in improving the cross linking degree but shortens the time before the start of scorching.

RE: COMPARATIVE EXPERIMENTS 5 AND 6

These experiments demonstrate that the combined use of OMA and αMS brings about a slight increase in the time before the start of scorching but no discernible effect on the maximum torque and that the OMA causes a decrease in the maximum torque.

RE: EXAMPLES 6, 7, 8, 12, 13, 15 AND 17 AND COMPARATIVE EXPERIMENTS 7 TO 10, 13 TO 15, 17, 18, AND 20

These experiments demonstrate that the combined use of an organic peroxide with MDIB prevents the effect of treatment from declining in the presence of an antioxidant (TBP) as an additive.

RE: EXAMPLES 10, 11, 14, 16, 18, AND 19 AND COMPARATIVE EXPERIMENTS 11, 12, 16, 19, 21, AND 22

These experiments demonstrate that the combined use of a plurality of organic peroxides has no influence on the effect of the treatment.

RE: EXAMPLES 7 AND 9

These experiments demonstrate that even the combined use of MDIB with TAIC, which is a conventional cross linking auxiliary, is effective in improving the cross linking degree and prolonging the time before the start of scorching.

RE: EXAMPLES 1 AND 19 AND COMPARATIVE EXPERIMENTS 2 AND 22

These experiments demonstrate that the conventional liquid peroxides are inferior to the peroxides of this invention in point of maximum torque and the time before the start of scorching.

EXAMPLE 20

A composition was obtained by mixing 500 g of high-density polyethylene (marketed by Ace Polymer K.K. as "HDF6080V") with 12.5 g of DCP, 5.0 g of MDIB (MDIB/DCP=0.40), and 1.0 g of TBP. This composition was kneaded with heating rolls at about 130° C. for about 20 minutes. The kneaded composition was tested in the same manner as in Example 1. As a result, the maximum torque at 180° C. was found to be 5.65 kgf.cm and the time before the start of scorching at 145° C. to be 9.3 minutes.

COMPARATIVE EXPERIMENT 23

The procedure of Example 20 was repeated, except that the use of MDIB was omitted. As a result, the maximum torque at 180° C. was found to be 3.50 kgf.cm and the time before the start of scorching at 145° C. to be 8.8 minutes.

Comparison of the results of Example 20 and Comparative Experiment 23 clearly reveals that high density polyethylene is as effective in improving the maximum torque and prolonging the time before the start of scorching as low density polyethylene when the polyethylene is used in combination with MDIB.

EXAMPLE 21

A composition was produced by mixing 500 g of the same polyethylene as used in Example 1 with 7.5 g of 25Y, 5.0 g of MDIB (MDIB/25Y=0.66), and 1.0 g of TBP. This composition was kneaded with heating rolls at about 110° C. for about 20 minutes. The kneaded composition was tested by the use of the Curastometer. As a result, the maximum torque at 200° C. was found to be 2.78 kgf.cm and the time before the start of scorching at 160° C. to be 32 minutes.

COMPARATIVE EXPERIMENT 24

The procedure of Example 21 was repeated, except that the use of MDIB was omitted. As a result, the maximum torque at 200° C. was found to be 2.17 kgf.cm and the time before the start of scorching at 160° C. to be 26 minutes.

Comparison of the results of Example 21 and Comparative Experiment 24 reveals that even at relatively high temperature, the use of MDIB is effective in improving the maximum torque and prolonging the time before the start of scorching.

EXAMPLE 22

A composition was obtained by mixing 500 g of an ethylene-propylene copolymer (propylene content 22%; marketed by Japan Synthetic Rubber Co., Ltd. as "JSR-EP912P") with 7.5 g of 25Y, and 2.5 g of MDIB (MDIB/25Y=0.33). This composition was kneaded by the use of heating rolls at about 60° C. for about 20 minutes. The kneaded composition was tested with the Curastometer. The maximum torque at 200° C. was found to be 10.47 kgf.cm and the time before the start of scorching to be 16 minutes.

COMPARATIVE EXPERIMENT 25

The procedure of Example 22 was repeated, except that the use of MDIB was omitted. The maximum torque at 200° C. was found to be 7.28 kgf.cm and the time before the start of scorching at 160° C. to be 10 minutes.

COMPARATIVE EXPERIMENT 26

The procedure of Example 22 was repeated, except that 2.5 g of αMS was used in place of MDIB. The maximum torque at 200° C. was found to be 8.15 kgf.cm and the time before the start of scorching at 160° C. to be 16 minutes.

EXAMPLE 23

A composition was obtained by mixing 500 g of an ethylene-vinyl acetate copolymer (vinyl acetate content 12% by weight; marketed by Mitsubishi Petro-Chemical Co., Ltd. as "EVA303E") with 7.5 g of 25B and 2.5 g of MDIB (MDIB/25B=0.33). This composition was kneaded by the use of heating rolls at about 80° C. for about 20 minutes. The kneaded composition was tested with the Curastometer. The maximum torque at 180° C.

was found to be 6.14 kgf.cm and the time before the start of scorching at 145° C. to be 10 minutes.

COMPARATIVE EXPERIMENT 27

The procedure of Example 23 was repeated, except that the use of MDIB was omitted. The maximum torque at 180° C. was found to be 4.66 kgf.cm and the time before the start of scorching at 145° C. to be 6 minutes.

COMPARATIVE EXPERIMENT 28

The procedure of Example 23 was repeated, except that 2.5 g of n-octyl acrylate was used in place of MDIB. The maximum torque at 180° C. was found to be 3.92 kgf.cm and the time before the start of scorching at 145° C. to be 9 minutes.

EXAMPLE 24

A composition was obtained by mixing 500 g of an ethylene-vinyl acetate copolymer (marketed by Mitsubishi Petro-Chemical Co., Ltd. as "EVA303E") with 12.5 g of 3M, and 2.5 g of MDIB (MDIB/3M=0.20). This composition was kneaded by the use of heating rolls at about 80° C. for about 20 minutes. The kneaded composition was tested with the Curastometer. The maximum torque at 145° C. was found to be 3.49 kgf.cm and the time before the start of scorching at 120° C. to be 12 minutes.

COMPARATIVE EXPERIMENT 29

The procedure of Example 24 was repeated, except that the use of MDIB was omitted. The maximum torque at 145° C. was found to be 2.89 kgf.cm and the time before the start of scorching at 120° C. to be 7 minutes.

EXAMPLES 25 TO 30

Compositions were obtained by mixing different organic peroxides with MDIB or XDIB as compounds represented by the formula (I) at the different mixing ratios indicated in Table 2. Each composition thus produced was placed in a test tube 20 mm in inside diameter and stirred and cooled at a temperature decreasing rate of 0.5° C. per minute to find the temperature at which the composition began to precipitate crystals. The results are shown in Table 2.

The composition was stored in a constant temperature bath at 30° C. for one month. Then, it was assayed for contents of additives by gas chromatography to determine the polymerization ratios of the additives. A composition was produced by mixing 20 g of the composition with 1,000 g of low density polyethylene pellets (marketed by Nippon Unicar Co., Ltd. as "NUC-9025"). This composition was placed in a polyethylene bag 0.05 mm in wall thickness, sealed therein, and left standing at a temperature of about 15° C. for 30 days. The amount of the composition volatilized during the standing was determined from the change in weight. The results are shown in Table 2.

COMPARATIVE EXPERIMENTS 30 TO 35

Compositions were obtained using various organic peroxides either singly or in the form of a mixture of two or more members as indicated in Table 2. They were tested in the same manner as in Example 25. The results are shown in Table 2.

TABLE 2

| Example No. | Peroxide (A) | (g) | Compound of formula (I) (B) | (g) | B/A | Temperature of precipitation (°C.) | Amount volatilized (%) | Polymerization ratio (%) |
|---|---|---|---|---|---|---|---|---|
| 25 | DCP | 100 | MDIB | 43 | 0.43 | 20.4 | 4.5 | 0.0 |
| 26 | DCP | 100 | MDIB | 67 | 0.67 | 13.8 | 5.7 | 0.0 |
| 27 | DCP | 100 | MDIB | 100 | 1.00 | 6.7 | 7.1 | 0.0 |
| 28 | DCP | 100 | XDIB | 50 | 0.50 | 17.7 | 4.7 | 0.0 |
| 29 | DCP IPC | 70 30 | MDIB | 30 | 0.30 | 9.6 | 3.3 | 0.0 |
| 30 | DCP IPC | 85 15 | MDIB | 15 | 0.15 | 18.7 | 1.5 | 0.0 |

| Comparative Experiment No. | Peroxide (A) | (g) | Additive (g) | Temperature of precipitation (°C.) | Amount volatilized (%) | Polymerization ratio (%) |
|---|---|---|---|---|---|---|
| 30 | DCP | 100 |  | 38.5 | 0.0 | — |
| 31 | DCP | 100 | TAIC 30 | 30 | 0.0 | 89.5 |
| 32 | DCP | 100 | αMS 30 | 27 | 9.8 | 0.0 |
| 33 | IPCC | 100 |  | 23 | 0.0 | — |
| 34 | DCP IPC | 70 30 |  | 25.5 | 0.6 | — |
| 35 | DCP IPC | 85 15 |  | 32 | 0.3 | — |

It will be noted from Table 2 that the compositions conforming to this invention showed low temperatures for precipitation of crystals as compared with the compositions omitting the addition of MDIB. In Examples 25 to 30, there were obtained cross linked compositions which were liquid at temperatures not exceeding 20° C.

Further, small amounts of the compositions of Examples 25 to 30 volatilized, differently from the composition of Comparative Experiment 32.

EXAMPLES 31 AND 32

Compositions using DCP, IPC and MDIB, or DCP, BCP and MDIB were tested for temperature of crystal precipitation in the same manner as in Example 25. The results are shown in FIGS. 2 and 3.

Figure 2:
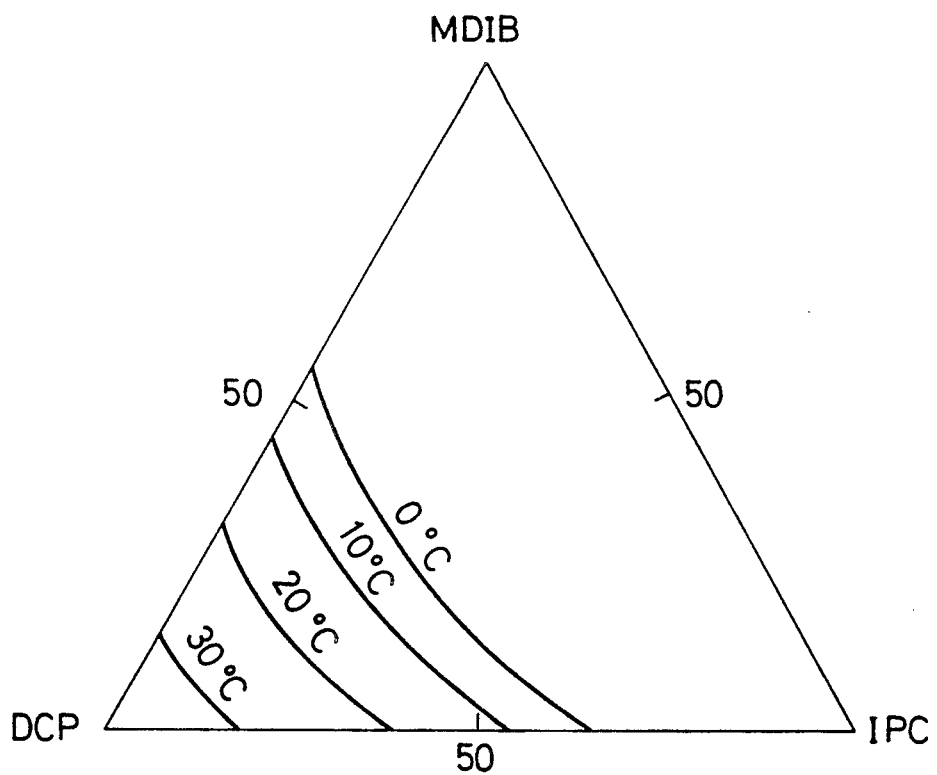
FIG. 2 is a diagram showing the relation between the percentage composition of a ternary composition of DCP, IPC, and MDIB and the temperature of precipitation of crystals.
Figure 3:
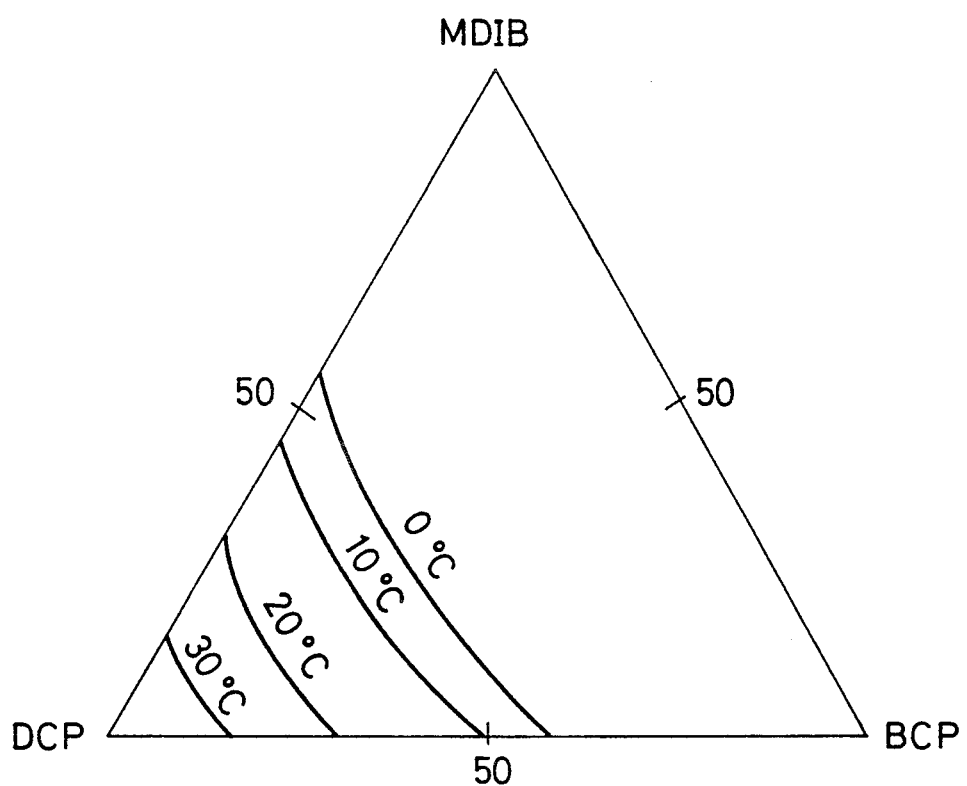
FIG. 3 is a diagram showing the relation between the percentage composition of a ternary composition of DCP, BPC, and MDIB and the temperature of precipitation of crystals.

It will be noted from FIGS. 2 and 3 that the composition using the combination of DCP and MDIB and possessing a solid state at 25° C. showed a decrease in the temperature for precipitation of crystals and that the additional incorporation therein of a liquid organic peroxide resulted in a further decrease in this temperature.

EXAMPLE 33 (PRODUCTION OF ELECTRIC POWER CABLE)

An electric power cable rated for 6 kV, having cross-sectional area of 38 mm², and insulated with cross linked polyethylene was produced by coating a conductor with an inner semiconducting layer of a composition of ethylene vinyl acetate, acetylene black, IPC, and MDIB (100/60/0.5/0.2 by weight ratio) extruded by the use of an extruding device, then coated with an insulating layer of a composition of low-density polyethylene, IPC, MDIB, and TBP (100/2.5/1/0.2 by weight ratio) extruded at 145° C. by the use of an extruding device, further coated with an outer semiconducting layer of the same composition as used in the inner semiconducting layer and extruded in the same manner as above, and thereafter cross linking the compositions in the superposed layers at 200° C. for 5 minutes. The AC breakdown voltage of the so-produced electric power cable was 250 kV. When a sample cut from the cross linked insulating coat of this cable was observed under a microscope, it showed no sign of "scorch". The sample was extracted with xylene at 130° C. for 5 hours and the extract was tested for gel content. Thus, the gel content was found to be 93%.

COMPARATIVE EXPERIMENT 36

An electric power cable was produced and tested by following the procedure of Example 33, except that an insulating composition consisting of low-density polyethylene, DCP, and TBP (100/2.5/1/0.2 by weight ratio) was used in place of the composition consisting of low-density polyethylene, IPC, MDIB, and TBP. The AC breakdown voltage of the so-produced electric power cable was 210 kV. A sample of the insulating coat of this cable, on observation under a microscope, showed signs of "scorch". When the sample was extracted with xylene at 130° C. for 5 hours and the extract was tested for gel content, the gel content was found to be 88%.

It is clear from the results of Example 33 and Comparative Experiment 35 that the electric power cable of this invention did not scorch, manifested high cross linking degree, and exhibited improved electrical properties as compared with the conventional electric power cable.

What is claimed is:

1. An ethylene polymer crosslinking composition consisting essentially of:
    an ethylene polymer;
    0.1 to 3 parts by weight, based on 100 parts by weight of said ethylene polymer, of m-diisopropenyl benzene; and
    0.3 to 5 parts by weight, based on 100 parts by weight of said ethylene polymer, of one crosslinking agent selected from the group consisting of dicumyl peroxide and bis(t-butyl peroxy isopropyl)benzene.

2. The composition according to claim 1, wherein the weight ratio of said crosslinking agent to said m-diisopropenyl benzene is in the range between 1:0.02 and 1.3.

3. The composition according to claim 1, wherein the amount of said m-diisopropenyl benzene is in the range between 0.1 and 1 part by weight based on part by weight of said crosslinking agent.

4. An ethylene polymer crosslinking composition consisting essentially of:
    an ethylene polymer;
    0.1 to 3 parts by weight, based on 100 parts by weight of said ethylene polymer, of m-diisopropenyl benzene; and
    0.3 to 5 parts by weight, based on 100 parts by weight of said ethylene polymer, of a crosslinking agent consisting of dicumyl peroxide and isopropyl cumyl-t-butyl peroxide.

5. An ethylene polymer crosslinking composition consisting especially of:
    an ethylene polymer;
    0.1 to 3 parts by weight, based on 100 parts by weight of said ethylene polymer, of m-diisopropenyl benzene; and
    0.3 to 5 parts by weight, based on 100 parts by weight of said ethylene polymer, of a crosslinking agent consisting of dicumyl peroxide and t-butyl cumyl peroxide.

* * * * *